US012676715B2

(12) United States Patent
Ahmadzadeh et al.

(10) Patent No.: US 12,676,715 B2
(45) Date of Patent: Jul. 7, 2026

(54) METHOD FOR UL WAVEFORM SWITCHING WITH GROUP COMMON DCI

(71) Applicant: Nokia Technologies Oy, Espoo (FI)

(72) Inventors: Arman Ahmadzadeh, Munich (DE); Amir Mehdi Ahmadian Tehrani, Munich (DE); Nhat-Quang Nhan, Massy (FR); Alessio Marcone, Munich (DE); Marco Maso, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 343 days.

(21) Appl. No.: 18/481,567

(22) Filed: Oct. 5, 2023

(65) Prior Publication Data

US 2024/0163050 A1    May 16, 2024

Related U.S. Application Data

(60) Provisional application No. 63/425,139, filed on Nov. 14, 2022.

(51) Int. Cl.
*H04L 5/00* (2006.01)
*H04W 72/044* (2023.01)
*H04W 72/23* (2023.01)

(52) U.S. Cl.
CPC ............ *H04L 5/005* (2013.01); *H04L 5/0007* (2013.01); *H04W 72/0473* (2013.01); *H04W 72/23* (2023.01)

(58) Field of Classification Search
CPC ... H04L 5/005; H04L 27/0008; H04L 5/0007; H04L 5/0091; H04L 26/2636; H04W 72/23; H04W 72/0473

USPC .......................................................... 370/329
See application file for complete search history.

(56) References Cited

U.S. PATENT DOCUMENTS

| | | | |
|---|---|---|---|
| 10,856,280 B2 | 12/2020 | Noh et al. | |
| 2018/0294916 A1 | 10/2018 | Akkarakaran et al. | |
| 2022/0210772 A1 | 6/2022 | Liu et al. | |
| 2023/0403110 A1* | 12/2023 | Taherzadeh Boroujeni | ................ H04L 5/0028 |
| 2024/0155641 A1* | 5/2024 | Taherzadeh Boroujeni | ................ H04L 27/2636 |

(Continued)

FOREIGN PATENT DOCUMENTS

WO        2021/260660 A1    12/2021

OTHER PUBLICATIONS

"3rd Generation Partnership Project; Technical Specification Group Radio Access Network; NR; Physical layer procedures for data (Release 17)", 3GPP TS 38.214, V17.3.0, Sep. 2022, pp. 1-232.

(Continued)

*Primary Examiner* — Asad M Nawaz
*Assistant Examiner* — Michael Wayne Maddox
(74) *Attorney, Agent, or Firm* — Carter, DeLuca & Farrell LLP

(57) ABSTRACT

An apparatus including at least one processor; and at least one non-transitory memory storing instructions that, when executed with the at least one processor, cause the apparatus to perform: receiving a group common downlink control information signal, where the group common downlink control information signal comprises at least one waveform switching indication bit; and determining, based upon the at least one waveform switching indication bit, information configured to be used for determining waveform switching.

1 Claim, 4 Drawing Sheets receiving a group common downlink control information signal, where the group common downlink control information signal comprises at least one waveform switching indication bit
702 determining, based upon the at least one waveform switching indication bit, information configured to be used for determining waveform switching
704

(56) References Cited

U.S. PATENT DOCUMENTS

| 2024/0284451 | A1 * | 8/2024 | Park | H04L 5/0094 |
| 2024/0349278 | A1 * | 10/2024 | Gu | H04L 27/0008 |

OTHER PUBLICATIONS

"New WI: Further NR coverage enhancements", 3GPP TSG RAN Meeting #94e, RP-213579, Agenda: 8.6.1, China Telecom, Dec. 6-17, 2021, 5 pages.

"3rd Generation Partnership Project; Technical Specification Group Radio Access Network; NR; Multiplexing and channel coding (Release 17)", 3GPP TS 38.212, V17.3.0, Sep. 2022, pp. 1-201.

"3rd Generation Partnership Project; Technical Specification Group Radio Access Network; NR; Physical layer procedures for control (Release 17)", 3GPP TS 38.213, V17.3.0, Sep. 2022, pp. 1-260.

"Discussion on dynamic switching between DFT-S-OFDM and CP-OFDM", 3GPP TSG RAN WG1 #110bis-e, R1-2209273, Agenda: 9.14.3, Xiaomi, Oct. 10-19, 2022, pp. 1-3.

"5G—Frame Structure—5G", ShareTechnote, Retrieved on Oct. 4, 2023, Webpage available at : https://www.sharetechnote.com/html/5G_DCI.html.

"Summary on Rel-17 TEIs", 3GPP TSG RAN WG1 #106bis-e, R1-2109722, Agenda: 8.18, NTT Docomo Inc, Oct. 11-19, 2021, pp. 1-101.

Extended European Search Report received for corresponding European Patent Application No. 23198677.9, dated Mar. 27, 2024, 10 pages.

"Discussion on dynamic waveform switching", 3GPP TSG RAN WG1 #110bis-e, R1-2208490, Agenda: 9.14.3, ZTE, Oct. 10-19, 2022, 5 pages.

* cited by examiner

*Example DCI 2_2 or 2_3*

*Example DWS via sizing bits of GC-DCI 2_2*

*Example DWS via a waveform switching indication bit of GC-DCI 2_2*

*Example DWS via a waveform switching indication bit of GC-DCI 2_2 with variable length*

*Example DWS via a waveform switching indication bit of GC-DCI 2_2 for subset of UEs*

METHOD FOR UL WAVEFORM SWITCHING WITH GROUP COMMON DCI

RELATED APPLICATION

The present application claims priority from, and the benefit of, U.S. Provisional Application No. 63/425,139, filed on Nov. 14, 2022, the contents of which is hereby incorporated by reference in its entirety.

BACKGROUND

Technical Field

The example and non-limiting embodiments relate generally to communication transmission waveforms and, more particularly, to switching waveforms.

Brief Description of Prior Developments

New Radio (NR) or 5G supports two waveforms in uplink (UL); discrete Fourier transform spread orthogonal frequency division multiplexing (DFT-s-OFDM) and cyclic prefix orthogonal frequency division multiplexing (CP-OFDM). CP-ODFM may be used in both uplink and downlink, while DFT-s-OFDM is used in uplink, only. In future radio-access technologies, DFT-s-OFDM may be used in downlink as well. Thus in 5G, for example, waveform switching applies to the uplink only. DFT-s-OFDM supports single layer transmission while CP-OFDM can support multi-layer UL transmission.

SUMMARY

The following summary is merely intended to be an example. The summary is not intended to limit the scope of the claims.

In accordance with one aspect, an example apparatus may be provided comprising: at least one processor; and at least one non-transitory memory storing instructions that, when executed with the at least one processor, cause the apparatus to perform: receiving a group common downlink control information signal, where the group common downlink control information signal comprises at least one waveform switching indication bit; and determining, based upon the at least one waveform switching indication bit, information configured to be used for determining waveform switching.

In accordance with another aspect, an example method may be provided comprising: receiving a group common downlink control information signal, where the group common downlink control information signal comprises at least one waveform switching indication bit; and determining, based upon the at least one waveform switching indication bit, information configured to be used for determining waveform switching.

In accordance with another aspect, an example apparatus may be provided comprising: means for receiving a group common downlink control information signal, where the group common downlink control information signal comprises at least one waveform switching indication bit; and means for determining, based upon the at least one waveform switching indication bit, information configured to be used for determining waveform switching.

In accordance with another aspect, an example apparatus may be provided comprising: circuitry configured for receiving a group common downlink control information signal, where the group common downlink control information signal comprises at least one waveform switching indication bit; and circuitry configured for determining, based upon the at least one waveform switching indication bit, information configured to be used for determining waveform switching.

In accordance with another aspect, an example apparatus may be provided comprising: at least one processor; and at least one non-transitory memory storing instructions that, when executed with the at least one processor, cause the apparatus to perform: determining a group common downlink control information signal, where the group common downlink control information signal comprises at least one waveform switching indication bit; providing information with the at least one waveform switching indication bit configured to be used for determining a waveform or a waveform switching to be used by a user equipment; and sending the group common downlink control information signal to a plurality of user equipments.

In accordance with another aspect, an example method may be provided comprising: determining a group common downlink control information signal, where the group common downlink control information signal comprises at least one waveform switching indication bit; providing information with the at least one waveform switching indication bit configured to be used for determining a waveform or a waveform switching to be used by a user equipment; and sending the group common downlink control information signal to a plurality of user equipments.

In accordance with another aspect, an example apparatus may be provided comprising: means for determining a group common downlink control information signal, where the group common downlink control information signal comprises at least one waveform switching indication bit; means for providing information with the at least one waveform switching indication bit configured to be used for determining a waveform or a waveform switching to be used by a user equipment; and means for sending the group common downlink control information signal to a plurality of user equipments.

In accordance with another aspect, an example apparatus may be provided comprising: circuitry configured for determining a group common downlink control information signal, where the group common downlink control information signal comprises at least one waveform switching indication bit; circuitry configured for providing information with the at least one waveform switching indication bit configured to be used for determining a waveform or a waveform switching to be used by a user equipment; and circuitry configured for sending the group common downlink control information signal to a plurality of user equipments.

According to some aspects, there is provided the subject matter of the independent claims. Some further aspects are provided in subject matter of the dependent claims.

BRIEF DESCRIPTION OF THE DRAWINGS

The foregoing aspects and other features are explained in the following description, taken in connection with the accompanying drawings, wherein.

DETAILED DESCRIPTION

Figure 1:
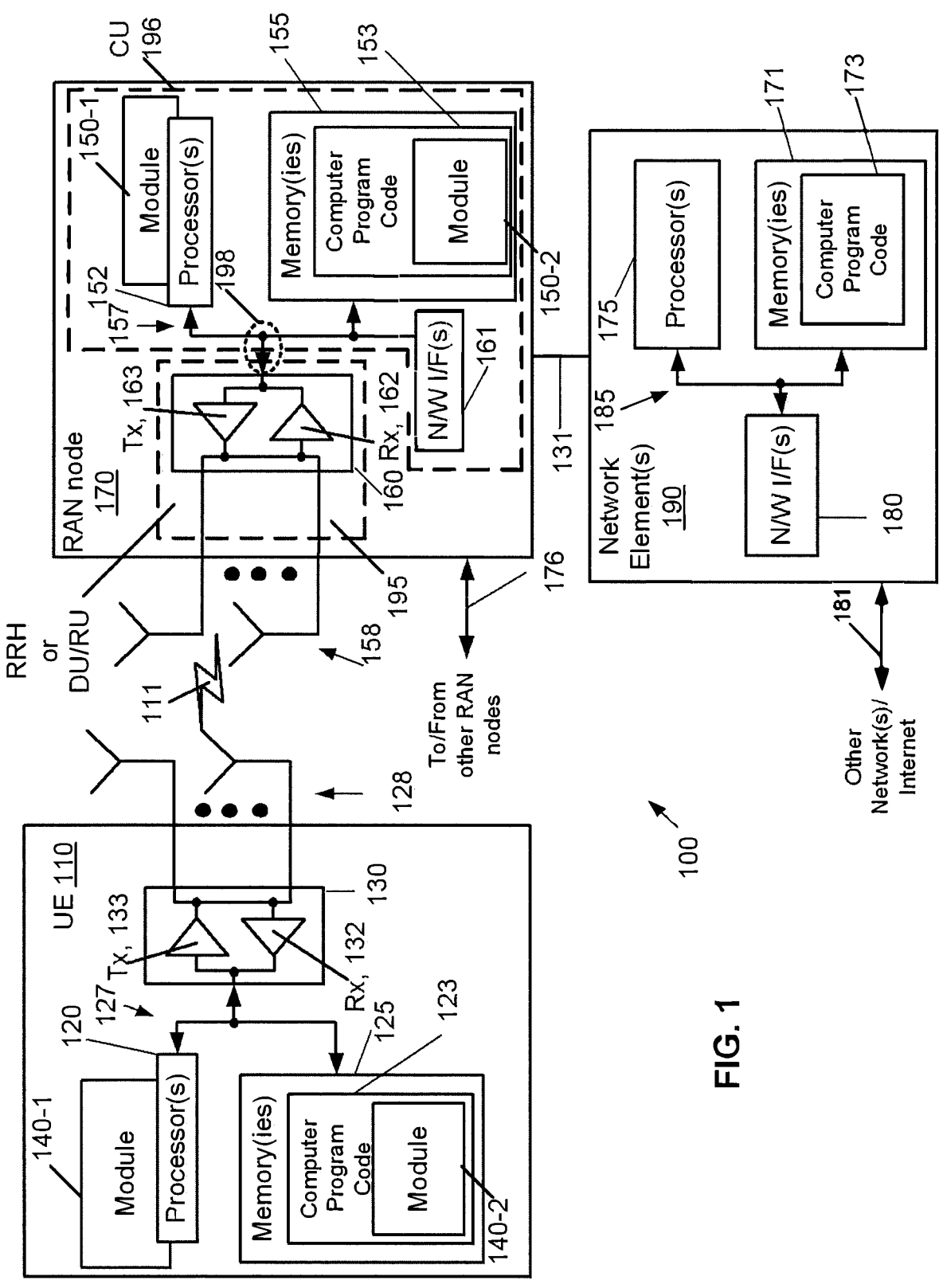
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
A-MPR Additional MPR
AMF access and mobility management function
CE UE Coverage Enhanced UE
CP-OFDM Cyclic prefix OFDM
CU central unit
DCI Downlink control information
DCI Format 0_1 UL grant configurable by RRC
DFT-s-OFDM Discrete Fourier transform spread orthogonal frequency division multiplexing
DU distributed unit
DWS Dynamic Waveform Switching
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
GC-DCI Group Common DCI
gNB (or gNodeB) base station for 5G/NR, i.e., a node providing NR user plane and control plane protocol terminations towards the UE, and connected via the NG interface to the 5GC
I/F interface
LSB Least significant bit
LTE long term evolution
MAC medium access control
MCS Modulation and coding scheme
MIMO Multiple Input Multiple Output
MME mobility management entity
MPR Maximum power reduction
MSB Most significant bit
ng or NG new generation
ng-eNB or NG-eNB new generation eNB
NR new radio
N/W or NW network
OFDM Orthogonal frequency division multiplexing
PDCCH Physical downlink control channel
PDCP packet data convergence protocol
PDU Protocol data unit
PHR Power headroom report
PHY physical layer
PUSCH Physical uplink control channel
QPSK Quadrature phase shift keying
RAN radio access network
RB, PRB Resource block, Physical RB Rel release
RLC radio link control
RNTI Radio network temporary identifier
RRH remote radio head
RRC radio resource control
RU radio unit
Rx receiver
SDAP service data adaptation protocol
S/P Serial-to-parallel
SGW serving gateway
SMF session management function
SR Scheduling request
TB Transform block
TEI Technical Enhancement Item
TPC Transmit power control
TS technical specification
Tx transmitter
UE user equipment (e.g., a wireless, typically mobile device)
UL uplink
UPF user plane function
WI work item Turning to FIG. 1, this figure shows a block diagram of one possible and non-limiting example in which the examples may be configured to operate in accordance with a cellular communication standard such as, for example, long term evolution, LTE, or fifth generation, 5G, also known as New Radio, NR, 5G-Advanced (i.e. NR Rel-18 and beyond) as well as 6G in which all specified by the $3^{rd}$ generation partnership project, 3GPP. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein may be used, in one example, in regard to dynamic waveform switching between discrete Fourier transform spread orthogonal frequency division multiplexing (DFT-s-OFDM) and cyclic prefix orthogonal frequency division multiplexing (CP-OFDM) for physical uplink control channel (PUSCH) transmission via group common downlink control information (DCI) formats. Features as described herein may be applied to any waveform combinations among CP-OFDM, DFT-s-OFDM, and any DFT-s-OFDM variations. Examples of such DFT-s-OFDM variations include DFT-s-OFDM with frequency domain spectrum shaping (FDSS), DFT-s-OFDM with FDSS and spectrum extension, DFT-s-OFDM with FDSS and without spectrum extension, DFT-s-OFDM with tone reservation, DFT-s-OFDM with FDSS, spectrum extension and tone reservation, and known variant DFT-s-OFDM. Even though some of the examples herein are represented from the viewpoint that there are two waveforms to choose from, in alternate examples more than two waveform candidates may be available to select or switch or toggle through.

As noted above, NR supports two waveforms in UL; DFT-s-OFDM and CP-OFDM. DFT-s-OFDM supports only a single transmission layer (rank=1) per user, whereas CP-OFDM can support more than one layer (rank>=1). A network can only configure waveform for UL transmission semi-statically. This means that even though a UE supports multiple Tx antennas, if configured with DFT-s-OFDM waveform, it is expected to transmit only with a single layer. CP-OFDM with more than one layer can offer a higher data throughput and capacity than DFT-s-OFDM. DFT-s-OFDM, on the other hand, has a lower peak-to-average power ratio, PAPR, than CP-OFDM, which allows DFT-s-OFDM to be used with a higher transmit power and to offer better coverage. The higher power may be used, since the lower PAPR works better with power amplifiers used in radio transmitters. For example, with QPSK modulation DFT-s-OFDM supports 1.5-2 dB higher transmit power (depending on the resource block allocation) compared to CP-OFDM (this is defined by means of allowed maximum power reduction compared to the nominal transmit power of the corresponding power class, such as 23 dBm (for Power Class 3)). In some cases, thus, DFT-s-OFDM may be desirable at a cell edge, for example, where a high transmit power, possibly maximum transmit power, may be needed, while CP-ODFM may be used nearer the base station controlling the cell, for example, to provide high-throughput services.

DFT-s-OFDM is generated by adding a transform precoding block before processing blocks used for generating CP-OFDM. The transform precoding block is a fast Fourier transform, FFT, (also known as discrete Fourier transform, DFT) block which converts a time domain signal into frequency domain signal. Due to the transform precoding block used in the transmitter, the waveform has to be separately configured so that receiver can perform the inverse fast Fourier transform operation, IFFT (or inverse discrete Fourier transform, IDFT).

In current NR specifications, a gNB configures the uplink waveform in a semi-static manner via RRC signalling as follows (see TR 38.214 section 6.1.3):

In case transformPrecoder in PUSCH-Config (or Config-uredGrantConfig) is enabled, DFT-S-OFDM waveform is applied for the corresponding PUSCH transmissions. Otherwise, CP-OFDM is applied.

In case msg3-transformPrecoder in RACH-ConfigCommon is configured, DFT-S-OFDM is applied for Msg3, or for the other PUSCH transmissions that are scheduled with DCI format 0_0 and the corresponding PDCCH is scrambled by CS-RNTI with NDI=1, C-RNTI, or MCS-CRNTI or SP-CSI-RNTI, or for the other PUSCH transmissions that are not scheduled with DCI format 0_0 in case transformPrecoder is not configured in PUSCH-Config and the corresponding PDCCH is scrambled by CS-RNTI with NDI=1, C-RNTI, or MCS-CRNTI or SP-CSI-RNTI. Otherwise, CP-OFDM is applied.

Downlink control information, DCI, is a set of information transmitted from a base station to a UE which schedules a downlink data channel, such as physical uplink shared channel, PDSCH, or an uplink data channel, such as PUSCH. A DCI may comprise, for example, a definition on which resource block will carry data to/from a UE and what kind of demodulation/modulation scheme a UE will have to use to decode/encode its data. The receiver will first decode DCI, and based on the information from the DCI it can decode the real data.

In the same Clause, the following is also specified:

For PUSCH transmission scheduled by a PDCCH with CRC scrambled by CS-RNTI with NDI=1, C-RNTI, or MCS-C-RNTI or SP-CSI-RNTI:

If the DCI with the scheduling grant was received with DCI format 0_0, the UE shall, for this PUSCH transmission, consider the transform precoding either enabled or disabled according to the higher layer configured parameter msg3-transformPre-coder.

If the DCI with the scheduling grant was not received with DCI format 0_0

If the UE is configured with the higher layer parameter transformPrecoder in pusch-Config, the UE shall, for this PUSCH transmission, consider the transform precoding either enabled or disabled according to this parameter.

If the UE is not configured with the higher layer parameter transformPrecoder in pusch-Config, the UE shall, for this PUSCH transmission, consider the transform precoding either enabled or disabled according to the higher layer configured parameter msg3-transformPrecoder.

In order to exploit the benefit of both UL MIMO transmission with CP-OFDM and power efficiency with DFT-s-OFDM, it is beneficial to support dynamic switching of waveform in UL transmission. Rel-18 WI defines justification for the dynamic waveform switching in the following way: "DFT-S-OFDM waveform is beneficial for UL coverage limited scenario because of its lower PAPR compared with CP-OFDM waveform. Currently, UL waveform is configured via RRC and this limitation imposes a large barrier to switch over to DFT-S-OFDM waveform for cell-edge UEs practically."

GC-DCI Formats in NR

DCI format 2_0, 2_1, 2_2 and 2_3 (known as Group Common DCIs (GC-DCI)) are used to provide common signaling to a group of UEs, wherein the payload can be partitioned into different blocks and each block conveys a specific indication for each UE within the group. In other words, each UE is able to extract its own information and ignore other information.

DCI format 2_2 is used to provide Closed Loop transmit power control (CL TPC) group common signalling for TPC commands for PUSCH and PUCCH. UE is addressed by TPC-PUSCH-RNTI or TPC-PUCCH-RNTI to scramble CRC bits which are added to DCI payload of DCI format 2_2 (See the description of DCI format 2_2 copied from TS 38.212 Clause 7.3.1.3.3 below).

"DCI format 2_2 is used for the transmission of TPC commands for PUCCH and PUSCH. The following information is transmitted by means of the DCI format 2_2 with CRC scrambled by TPC-PUSCH-RNTI or TPC-PUCCH-RNTI:

block number 1, block number 2, . . . , block number N

The parameter tpc-PUSCH or tpc-PUCCH provided by higher layers determines the index to the block number for an UL of a cell, with the following fields defined for each block:

Closed loop indicator—0 or 1 bit.
  For DCI format 2_2 with TPC-PUSCH-RNTI, 0 bit if the UE is not configured with high layer parameter twoPUSCH-PC-AdjustmentStates, in which case UE assumes each block in the DCI format 2_2 is of 2 bits; 1 bit otherwise, in which case UE assumes each block in the DCI format 2_2 is of 3 bits;
  For DCI format 2_2 with TPC-PUCCH-RNTI, 0 bit if the UE is not configured with high layer parameter twoPUCCH-PC-AdjustmentStates, in which case UE assumes each block in the DCI format 2_2 is of 2 bits; 1 bit otherwise, in which case UE assumes each block in the DCI format 2_2 is of 3 bits;
TPC command—2 bits The number of information bits in format 2_2 shall be equal to or less than the payload size of format 1_0 monitored in common search space in the same serving cell. If the number of information bits in format 2_2 is less than the payload size of format 1_0 monitored in common search space in the same serving cell, zeros shall be appended to format 2_2 until the payload size equals that of format 1_0 monitored in common search space in the same serving cell."

Table 1 depicts DCI 2_2 contents in terms of blocks and corresponding bits. As it can be seen, DCI Format 2_2 can accommodate up to 15 blocks where each block is specific to each UE. A block can be of size 2 or 3 bits. First 2 bits of block indicate TPC command. When using two power control adjustments states, block size is of size 3 bits where 3rd bit specifies power control adjustment state. Using TPC-PUSCH-RNTI or TPC-PUCCH-RNTI and TPC indices, UE will decode and extract its specific block. Zero padding is added in the end to make the size the same to DCI Format 1_0 monitored in common search space in the same serving cell. Zero padding is a form of padding using only zeros.

| Block | Number of bits within DCI |
|---|---|
| Block 1 | 2 or 3 |
| Block 2 | 2 or 3 |
| . . . | . . . |
| Block N | 2 or 3 |
| Zero padding | Depends on the size of DCI 1_0 |

DCI 1_0

DCI Format 1_0 with CRC scrambled by C-RNTI is specified in TS 38.212 Clause 7.3.1.2.1.

As it can be seen, Size of DCI 1_0 in common search space is as follows:

$$DCI \text{ Format } 1\_0_{size} = 28 + \left\lceil Log_2\left(N_{RB}^{DL,BWP}\left(N_{RB}^{DL,BWP} + 1\right)/2\right)\right\rceil$$

Where $$N_{RB}^{DL,BWP}$$

is determined via clause 7.3.1.0 of TS 38.212 as follows:
  The size of CORESET 0 if CORESET 0 is configured for the cell; and
  The size of initial DL bandwidth part if CORESET 0 is not configured for the cell The potential sizes of $$N_{RB}^{DL,BWP}$$

for CORESET 0 are {24, 48 96} PRBs (or PBs), see TS 38.213 tables 13-1 until 13-10. Taking this into account, now we can calculate the different sizes of DCI format 1_0 based on different values of $$N_{RB}^{DL,BWP}.$$

After obtaining the different sizes of DCI 1_0, we can identify the cases in which zero-padding is needed for DCI 2_2 or DCI 2_3 to have their size aligned with that of DCI 1_0. The summary of this analysis is summarized in the tables below.

TABLE 1

| | | 24 PRBs | | |
| | | | | |
| Block length | $N_{max}$ | Length of zero-padded bits | $N < N_{max}$ | Length of zero-padded bits |
|---|---|---|---|---|
| 2 | 15 | 7 | 14 | 9 |
| 3 | 12 | 1 | 11 | 4 |

TABLE 2

| | | 48 PRBs | | |
| | | | | |
| Block length | $N_{max}$ | Length of zero-padded bits | $N < N_{max}$ | Length of zero-padded bits |
|---|---|---|---|---|
| 2 | 15 | 9 | 14 | 11 |
| 3 | 13 | 0 | 12 | 3 |

TABLE 3

| | | 96 PRBs | | |
| | | | | |
| Block length | $N_{max}$ | Length of zero-padded bits | $N < N_{max}$ | Length of zero-padded bits |
|---|---|---|---|---|
| 2 | 15 | 11 | 14 | 13 |
| 3 | 13 | 2 | 12 | 5 |

Generally, "zero padding" bits or "zero-padded" bits are the zeros which already exists and can be added to DCI 2_2 or 2_3 in order to be the same size to DCI Format 1_0 monitored in common search space in the same serving cell. In the above tables, N_max shows the maximum number of TPC command blocks (corresponding to the maximum number of supported UEs to receiver GC-DCI) that is possible to be configured based on the size of DCI 1_0 and its corresponding alignment of zero-padded bits for DCI format 2_2. Furthermore, based on the current specification, N_max is always upper bounded by the value of 15. Moreover, the required number of zero-padded bits are represented in the 3rd column of each table for the case when N=N_max. As can be observed, for most of the scenarios, at least, one zero-padded bit is required. On the other hand, gNB may configure the group common indication with a smaller number of UEs than with N_max. In that case, i.e., when N<N_max, the required number of zero-padded bits will be increased. In the tables above, one example of the case where N<N_max is shown in column 4 of the tables and its corresponding required zero-padded bits are calculated as in 5th column. It can be observed that when N<N_max, zero-padding is always required.

If switching indication is conveyed by DL DCI, the UE may check the receiving DCI for the potential PUSCH waveform indication and may consider the application time of the switching. UE Group Common DCI as one of the use cases for non-UL scheduled DWS indication may address the following aspects with features as described herein:

Current GC-DCI Format 2_2 or 2_3 does not support either adding additional bit(s)/field in an existing DCI 2_2 or 2_3 or using existing formats for DWS indication.

The mechanism for DWS indication without changing DCI format has not been specified.

The mechanism for DWS indication without changing GC-DCI format should minimize, if not avoid, any impacts on scheduling flexibility.

The mechanism for DWS indication without changing GC-DCI Formats 2_2 or 2_3 should be feasible considering bitwidth of DCI Format 1_0 which is being monitored in common search space in the same serving cell.

For UE group common dynamic waveform switching (DWS), several example methods are described herein. Features as described herein may use methods to exploit the structure of some of the existing GC-DCI in 5G NR specifications such as, for example, DCI formats 2_2 and 2_3, to carry the DWS indication by a gNB.

In a first example method, the method may use or exploit the fact that the payload of DCI formats 2_2 and 2_3 require zero-padding to be at the same size as DCI Format 1_0 monitored in common search space in the same serving cell, and thus, the DWS indication can be carried by at least one bit of zero-padded bits. In a second example method, the method may use or exploit that the TPC commands carried by different blocks in DCI formats 2_2 and 2_3 is used for DWS indication such as, for example, specific value(s) of TPC command can be interpreted as DWS indication, given certain condition(s) is fulfilled at UEs and/or gNB. The details of both example methods are further discussed below. Furthermore, features of using the second method is multiple. For example, it can be used a) jointly with the first method to provide a further degree-of-freedom to address a subset of the UEs that can decode GC-DCI, and/or b) to serve as a fallback mechanism when the first method is not applicable, for instance, when the size of zero-padded bits is zero.

Figure 2:
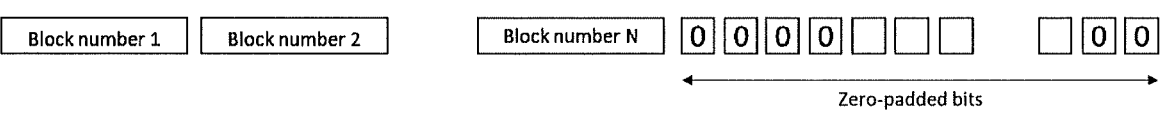
FIG. 2 is a diagram illustrating an example of a DCI with zero-padding bits of a GC-DCI 2_2 or 2_3.

A GC-DCI Indication of DWS may be provided to a group of UEs. The indication may be carried by zero-padded bits of GC-DCI such as, for example, DCI formats 2_2 and 2_3, and/or specific values of TPC command. For clarity of exposition, we denote the zero-padded sequence of bits appended to the payload of DCI 2_2 or DCI 2_3 by B={$b_1$, $b_2$, $b_3$, ... $b_L$} and its length by L. Furthermore, we denote the kth bit in B with $b_k$. Moreover, we denote the length of DWS indication, when indication is carried with more than one bit by M≤L where M represents bits of GC-DCI payload (including zero-padded bits) employed to indicate DWS. It should be noted that the indication that the DWS is carried by zero-padded bits may not be technically correct to refer to these bits as zero-padded since some of the zero-padded bit(s) currently take values other than zero. However, for the convenience of presentation, we still refer to them as zero-padded bits herein because the term zero-padded bits is known. One example structure of DCI 2_2 or DCI 2_3 is depicted in FIG. 2. Because of the new feature, as described herein, of providing information with a bit which was previously only used for padding, a better term (for when bits are added to a DCI signal to provide both a uniform DCI size format in addition to optionally including information) is "bit-padding" or "bit-sizing" or being "bit padded"; where the extra bits may be zeros or ones. Likewise a better term than "zero-padded bit" for one or more bits added to a DCI signal to provide a uniform DCI size format and which is now also optionally available to include information, is a "sizing bit"; where the bit(s) may be zeros or ones. Conventional zero-padding uses bits to provide a uniform size format, but the bits are only zero (0) bits. Whereas, unlike conventional zero-padding, bit-sizing of a DCI signal may use one or more zeros (0) and/or one or more ones (1) as the bit(s). One or more of the bit(s) used for bit-sizing may contain information which is configured to be used by a user equipment. So, a sizing bit may perform the padding function similar to a zero-padded bit and, optionally, provide information in addition to performing the padding function. Not all sizing bits need to provide information. One or more sizing bits may be a zero-padding bit. The term "sizing bit" as used herein is intended to be a genus term for the two species: 1. a first species comprising a zero-padded bit used only for padding and 2. a second species comprising a bit used for both a. information communication and b. padding. Use of a sizing bit with information communication can provide information in addition to performing the padding function and does not include any additional bits to the DCI field other than the currently used zero padding bits.

It should also be noted that in 3GPP, a "signal" is typically used for e.g. reference signals and synchronization signals, while DCI might be considered a "channel" such as a physical downlink control channel in the 3GPP terminology. Thus, a group common downlink control information (GC-DCI) signal might also be referred to as a group common downlink control information (GC-DCI) channel, or a physical downlink control channel, or a group common downlink control information format, such as DCI format 2_2 or DCI format 2_3 for example.

In a first example embodiment, the indication of the DWS is provided to all the UEs that can decode GC-DCI format 2_2 and/or 2_3, wherein the indication is carried by one of the bits of the zero-padded bits to the payload of GC-DCI.

With this first example embodiment, one example implementation of this method can be to always choose MSB or LSB bit of zero-padded bits for waveform switching. For example, assuming that MSB is used and length of zero-padded bits is 3, the DWS is always indicated by "100" bit stream. This means that if the MSB of the zero-padded bits is different than "0", then the UE may switch to a second waveform (which could be configured or hardcoded in specification) that is different from a first waveform (which could be the current or configured (default) waveform).

Figure 3:
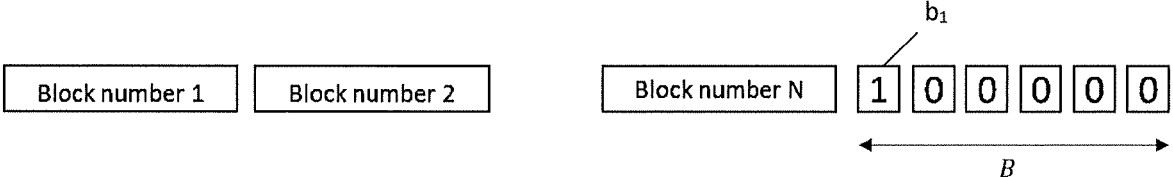
FIG. 3 is a diagram illustrating an example of DWS with sizing bits of a GC-DCI 2_2.

Referring also to FIG. 3, this example (Example A) reflects the first implementation of the first example embodiment. Let us assume that UE is configured with higher layer parameter "tpc-PUSCH" which refer to block index, e.g., 2. In other words, UE will decode Block number 2 to receive its corresponding TPC command. Let us further assume that L=6. Now, coverage enhanced UE (e.g., without discarding B or discarding part of B, e.g., the last L−1 bits) checks the first bit of B i.e., $b_1$. If $b_1=1$, then the UE may perform waveform switching. If $b_1=0$, then the UE does not need to perform waveform switching. The UE may need to know the starting position of $b_1$ in the entire DCI payload.

With the first example embodiment, another example implementation of this method can be to always choose MSB or LSB bit of zero-padded bits for waveform indication. The value of the MSB or LSB for waveform indication may be configured or hardcoded in the specification. For example, this may comprise assuming "0" is associated with CP-OFDM and "1" is associated with DFT-s-OFDM. Assuming that MSB is used, and assuming that the length of zero-padded bits is 3, CP-OFDM may be indicated by a "000" bit stream and "DFT-s-OFDM" is indicated by a "100" bit stream; regardless of the current/configured waveform. Assuming that LSB is used, and assuming the length of zero-padded bits is 3, CP-OFDM may be indicated by a "000" bit stream and "DFT-s-OFDM" may be indicated by a "001" bit stream; regardless of the current/configured waveform. Thus, the bit may be used to select a waveform (a form of waveform indication/selection) as noted above where "0" may be associated with CP-OFDM and "1" may be associated with DFT-s-OFDM, or (as noted with reference to Example A) the bit may be used to trigger a switch to another waveform than the current waveform (a form of waveform toggling or switching). These are merely some examples of how a bit previously only used for zero-padding may now be used for both padding and information conveyance. If there are more than two possible waveforms, more than one bit could be used. For example, if there are three possible waveforms, $b_1$ and $b_2$ could be used where "10" indicated a first waveform, "01" indicates a second waveform, and "11" indicates a third waveform. As another example, $b_6$ could be used as an indicator for the UE to look at $b_1$ and/or $b_2$ for waveform indication/selection information.

Figure 4:
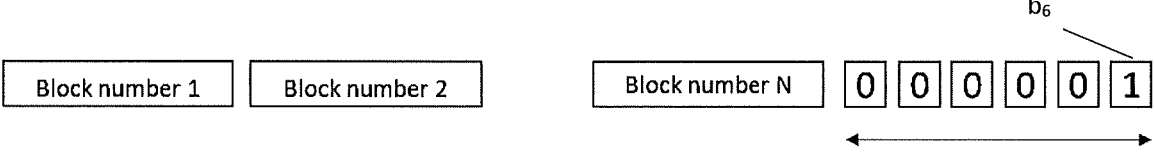
FIG. 4 is a diagram illustrating an example of DWS with a waveform switching indication bit of GC-DCI 2_2.

Referring also to FIG. 4, this example (Example B) reflects the second implementation of the first embodiment. Let us consider the same configuration as in Example A, except that now the DWS indication is carried via the last bit in B, i.e., $b_6$. The advantage of this implementation is that exact location $b_L$ is not required (location $b_L$ is known or location $b_L$ is not required to be signaled to the UE) as UE always must decode the last bit in B (must always decode $b_6$ in the above example).

Generally, for both example implementations, the method of the first example embodiment is simple and straightforward to implement. If zero-padding is not required, then the proposed method may not be applicable. Because of using only a single bit to indicate DWS, the flexibility may be reduced such as, for example, it may only indicate to UEs the switching to DFT-S-OFDM from CP-OFDM or the switching from DFT-S-OFDM to CP-OFDM of certain rank. However, these may be addressed with a gNB scheduler such as, for example, avoid configuring/scheduling without zero padding if DWS is needed by grouping a smaller group of UEs.

In the above examples, the sizing bit configured for information communication provides the function of a bit for indicating waveform switching information. Thus, the sizing bit may be considered a "waveform switching indication bit". In alternate embodiments, a "waveform switching indication bit" is not limited to a sizing bit configured for information communication. The "waveform switching indication bit" may be provided with one or more other bit(s) in the GC-DCI signal. Some examples of this are described below. Thus, the waveform switching indication information may be carried by one or more bit which is not a zero-padded bit(s). This is the case as in the fourth example embodiment described below (as a fallback mechanism), and also explicit indication implementation as in the second example embodiment described below (where indication is carried by at least one TPC block). So, a "waveform switching indication bit" may be either one or more sizing bit having information and/or one or more a bit which is not a sizing bit (a non-sizing bit). In one type of example embodiment the at least one "waveform switching indication bit" may comprise a sizing bit and a non-sizing bit. In an alternate example embodiment a new field may be added to the DCI and, as any other information field, this new field may not have a padding/sizing purpose. It is possible that a waveform indicator (i.e. information bit(s) or one or more "waveform switching indication bit") is added to DCI 2_2 or 2_3 without increasing the DCI size at least in some sizes of the DL bandwidth part.

In a second example embodiment, the indication of the DWS may be provided to all the UEs that can decode GC-DCI format 2_2 and/or 2_3, wherein the indication may be carried by at least two bits of the payload of GC-DCI including the zero-padded bits. By conveying the DWS indication via at least two bits, the flexibility of DWS, in terms of different modes of switching, is increased. For this second example method, the UE may also identify the bit length of DWS indication and its location within the payload of GC_DCI. A bit length might be also referred to as a bit width.

With this second example embodiment, one example implementation of this method can be to explicitly inform the UE about the size and the location of DWS indication bits within the payload of GC-DCI. For instance, according to the current specifications, a maximum number of TPC command blocks carried via GC-DCI 2_2 and/or 2_3 is 15 (i.e., maximum number of 15 UEs can be addressed by GC-DCI 2_2 or 2_3). Here, a gNB can configure the group common indication with a smaller number of UEs (a number smaller than 15 such as, for example, with 14 UEs) than the supported maximum one and, consequently, reuse at least one of the released TPC block(s) for sending the indication of DWS. The released TPC block(s) used for the purpose of DWS indication can be any one of the possible TPC block in the DCI payload such as, for example, the first block or the last block. The size of the TPC block used for the DWS indication may be determined such as, for example, (2 or 3 bits) via RRC configuration, based on the number of waveforms switching variations.

With this second example embodiment, another example implementation of this method can be that the UE implicitly identifies the length and the location of the DWS indication bits within the payload of GC-DCI. For implicit indication, zero-padded bits can be used. For example, let us assume that the total length of zero-padded bits is 4 such as, for example, without DWS indication "0000" is appended to the payload of GC-DCI 2_2 and/or 2_3. Now, the UE can implicitly identify the length of the DWS indication bits via counting the number of bits set to "1" starting from the beginning of the zero padded bits. For instance, by decoding any of the sequence bits {"0100", "1100"} instead of the zero-padded bits, the UE may implicitly identify that the length of DWS indication is 2 bits, as the index of the last bit "1" here is two. As such, more than two modes of switching (e.g., switching from DFT-S-OFDM to CP-OFDM with higher Rank>1) can be indicated here.

Figure 5:
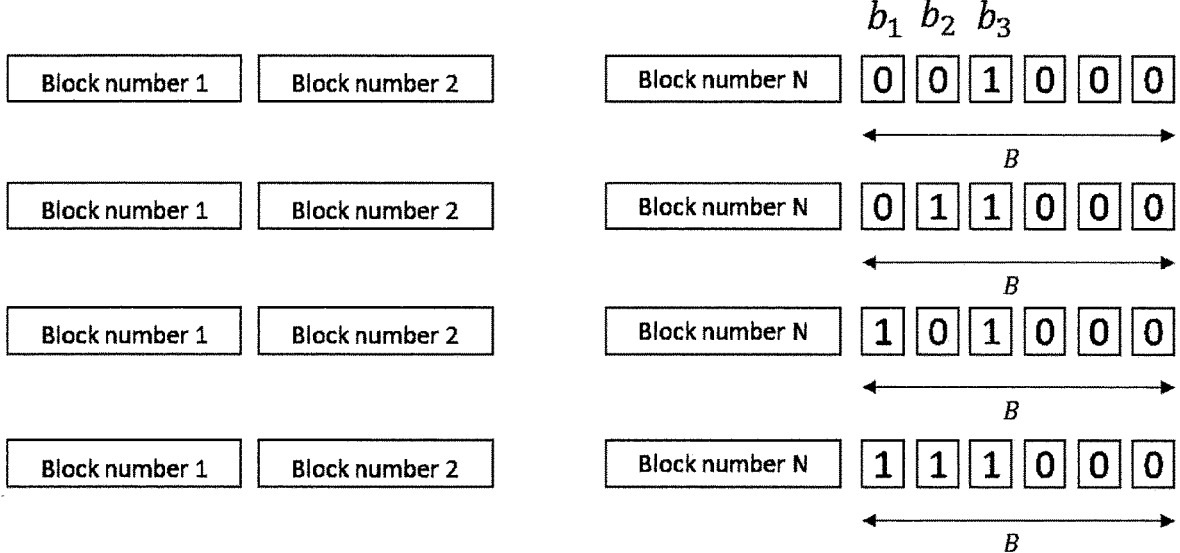
FIG. 5 is a diagram illustrating examples of DWS with a waveform switching indication bit of GC-DCI 2_2 with variable length.

Referring also to FIG. 5, this example (Example C) reflects an implementation of the second example embodiment noted above. In particular, where the UE implicitly identifies the length of DWS, i.e., M. Let us assume that L=6 and M=3. Then, upon receiving DCI 2_2 and/or DCI 2_3, the UE may implicitly identify the index (location) of the last bit in B which is set to "1". For example, for the bit stream "001000", the UE may implicitly identify the index (location) of the last bit in B which is set to "1", namely at $b_3$. Using this information, the UE may use $b_1$ and $b_2$, "00" in this example, to select the waveform use as a parameter to switch to a waveform. As another example, for the bit stream "011000", the UE may implicitly identify the index (location) of the last bit in B which is set to "1", namely at $b_3$. Using this information, the UE may use $b_1$ and $b_2$, "01" in this example, to select the waveform use as a parameter to switch to a waveform. As another example, for the bit stream "101000", the UE may implicitly identify the index (location) of the last bit in B which is set to "1", namely at $b_3$. Using this information, the UE may use $b_1$ and $b_2$, "10" in this example, to select the waveform use as a parameter to switch to a waveform. As another example, for the bit stream "111000", the UE may implicitly identify the index (location) of the last bit in B which is set to "1", namely at $b_3$. Using this information, the UE may use $b_1$ and $b_2$, "11" in this example, to select the waveform use as a parameter to switch to a waveform. Use of $b_3$ is merely an example because, in the above examples, $b_3$ is the last bit set to "1". It may be better if the counting or indexing starts from the last bit detected as having a value "1" as noted above, or perhaps the last bit $b_6$, not from the first bit $b_1$ because the location of $b_1$ might not be known (it dependents on the number of blocks) while the location of the last bit is known to the UE.

Here, since M=3, $b_3$=1. Subsequently, the UE may perform waveform switching based on the values of $b_1$, $b_2$, . . . $b_{M-1}$, i.e., in this example based on $b_1$ and $b_2$. The main advantage of this implementation method is that multiple modes of waveform switching can be supported. However, the UE cannot discard the entire zero-padded bits to identify the length of DWS. Based on the example above, the following modes of DWS can be considered.

| Waveform | $b_1$ | $b_2$ |
|---|---|---|
| DFT-S-OFDM | 0 | 0 |
| CP-OFDM with rank 1 | 0 | 1 |
| CP-OFDM with rank > 1 | 1 | 0 |
| CP-OFDM with rank > 1 | 1 | 1 |

In a third example embodiment, the indication of the DWS may be provided to a subset of the UEs that can decode GC-DCI format 2_2 and/or 2_3, wherein the DWS can potentially be indicated via at least one of the methods introduced in the above embodiments jointly with TPC command blocks, wherein certain value(s) of the TPC command may specify that the UE(s) are required to perform DWS.

With this third example embodiment, an example implementation of this method can be realized via any of the implementations introduced in the above embodiments (the first example embodiment and/or the second example embodiment), for indication of DWS in zero-padded bits, and to assume that positive value(s) of TPC commands specifies/triggers the UE to look at the zero padded bits and perform waveform switching if indicated. In other words, every UE that decodes its corresponding TPC command (from specific block number), and upon receiving a positive value, may analyze the zero-padded bits to further identify the mode of DWS. The UEs that receive a negative or zero value, may discard analyzing of the zero-padded bits. As stated above, one of the main advantages of the method introduced in this third example embodiment is that an extra degree of freedom is provided to only address a subset (less than all) of the UEs receiving GC-DCI formats 2_2 and/or 2_3.

Figure 6:
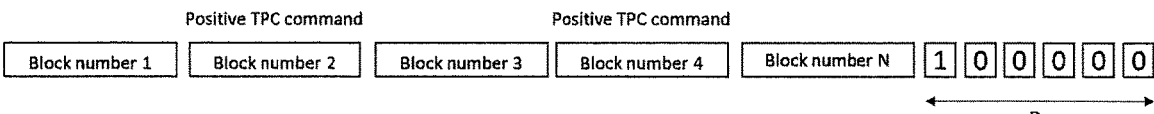
FIG. 6 is an example of DWS with a waveform switching indication bit of GC-DCI 2_2 for subsets of UEs.

Referring also to FIG. 6, this example (Example D) reflects an implementation of the third example embodiment described above. Here, for simplicity we consider the configuration of Example A, while at the same time, in order to address only a subset of the UEs that receive GC-DCI 2_2/2_3; only those UEs that receive a positive value for TPC command proceed with decoding the zero-padded bits and perform waveform switching accordingly. For instance, in FIG. 6 only the UEs with "tpc-PUSCH" indices 2 and 4, which received positive TPC command, perform waveform switching.

In a fourth example embodiment, the indication of the DWS may be provided to a subset of the UEs that can decode GC-DCI format 2_2 and/or 2_3, wherein the indication may be carried via certain value(s) of the TPC command. This method may be chosen as a fallback approach such as, for example, when zero-padding cannot be performed/supported in any of the embodiments mentioned above.

One example implementation of this fourth example embodiment, a method may assume that positive value(s) of a TPC commands specifies the subset of UEs require to perform waveform switching. In this method, an earlier indication (e.g., via RRC, MAC-CE) may be used for indicating that the TPC command is used for indicating waveform switching. Alternatively, the UE may automatically use the TPC command for waveform switching if the number of zero padded bits is zero such as, for example, if there is no zero padding of DCI 2_2 and/or 2_3.

In one type of alternative example, an earlier indication (e.g., via RRC, MAC-CE) may be used for indicating that the group common DCI (and one of the above method) is used for indicating waveform switching. This might be for when a TPC command is not used, but an indication for waveform switching when GC-DCI is applied and one of above methods is employed.

With features as described herein, waveform switching (WS) by GC-DCI may be performed, and some examples of how to do this are described herein. Because the WS indication may be carried by bits which were previously designated as padding bits in 3GPP, in the future 3GPP may adopt/interpret that bits are a "new" information bit (such as bits for TPC commands that are information bits based on current specs). Thus, rather than only indicating the bits as padding bits, the bits are also indicated herein as being sizing bits or waveform switching indication bits.

With features as described herein, technical effects may include indicating waveform switching substantially without additional overhead in a group common DCI. With features as described herein, waveform switching may be indicated substantially without incurring scheduling restrictions. With features as described herein, waveform switching may be indicated for uplink transmissions which do not use a dynamic UL PDCCH grant.

In accordance with an example embodiment, an example apparatus is provided comprising: at least one processor; and at least one non-transitory memory storing instructions that, when executed with the at least one processor, cause the apparatus to perform: receiving a group common downlink control information signal, where the group common downlink control information signal comprises at least one waveform switching indication bit; and determining, based upon the at least one waveform switching indication bit, information configured to be used for determining waveform switching.

The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may be in a transmit power control command. The at least one waveform switching indication bit may be configured to perform a padding function in the group common downlink control information signal. The waveform switching may comprise dynamic waveform switching (DWS) comprising CP-OFDM and DFT-s-OFDM. The instructions, when executed with the at least one processor, may cause the apparatus to perform: determining a bit length of the at least one waveform switching indication bit; and determining a location of the at least one waveform switching indication bit within a payload of the group common downlink control information signal. The determining of the bit length and/or the location may be based upon information in a transmit power control (TPC) command block. The determined information may be configured to be used to perform switching between two waveforms. The instructions, when executed with the at least one processor, may further cause the apparatus to perform: determining, based upon additional information received with a transmit power control (TPC) command block of the group common downlink control information signal, that the apparatus is to use the information to perform waveform switching. The instructions, when executed with the at least one processor, may further cause the apparatus to determine from the additional information that the apparatus is to perform the determining of the information configured to be used for the determining of the waveform switching. The at least one waveform switching indication bit may comprise a value in a transmit power control (TPC) command block, where the apparatus is configured to perform the determining of the information based, at least partially, upon the value in the TPC command block. The instructions, when executed with the at least one processor, may further cause the apparatus to perform: determining from a MAC control element that information in a transmit power control (TPC) command block is to be used as the at least one waveform switching indication bit. The instructions, when executed with the at least one processor, may further cause the apparatus to perform: determining from a radio resource control MAC control element that the group common downlink control information signal is to be used for determining the waveform switching. The at least one waveform switching indication bit may comprise at least one of: determining a most significant bit; determining a least significant bit; determining at least two bits; or determining only a single bit.

Figure 7:
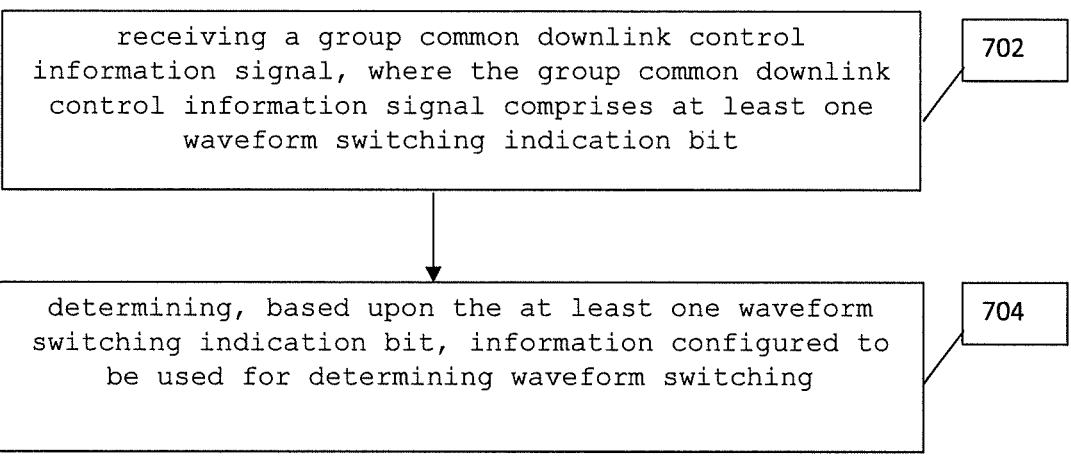
FIG. 7 is a diagram illustrating one example of a method comprising features as described herein.

Referring also to FIG. 7, in accordance with an example embodiment, an example method is provided comprising: receiving a group common downlink control information signal, where the group common downlink control information signal comprises at least one waveform switching indication bit as illustrated with block 702; and determining, based upon the at least one waveform switching indication bit, information configured to be used for determining waveform switching as illustrated with block 704.

The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may be in a transmit power control command. The at least one waveform switching indication bit may perform a padding function in the group common downlink control information signal. The waveform switching may comprise dynamic waveform switching (DWS) comprising CP-OFDM and DFT-s-OFDM. The method may further comprise determining a bit length of the at least one waveform switching indication bit; and determining a location of the at least one waveform switching indication bit within a payload of the group common downlink control information signal. The determining of the bit length and/or the location may be based upon information in a transmit power control (TPC) command block. The determined information may be configured to be used to perform switching between two waveforms. The method may further comprise: determining, based upon additional information received with a transmit power control (TPC) command block of the group common downlink control information signal, that the apparatus is to use the information to perform waveform switching. The method may further comprise determining from the additional information that the apparatus is to perform the determining of the information configured to be used for the determining of the waveform switching. The at least one waveform switching indication bit may comprise a value in a transmit power control (TPC) command block, where the method comprises the determining of the information based, at least partially, upon the value in the TPC command block. The method may further comprise: determining from a MAC control element that information in a transmit power control (TPC) command block is to be used as the at least one waveform switching indication bit. The method may further comprise determining from a radio resource control MAC control element that the group common downlink control information signal is to be used for determining the waveform switching. The at least one waveform switching indication bit may comprise at least one of: determining a most significant bit; determining a least significant bit; determining at least two bits; or determining only a single bit.

In accordance with an example embodiment, an example apparatus is provided with a non-transitory computer readable medium comprising program instructions that, when executed with an apparatus, cause the apparatus to perform the method described above.

In accordance with an example embodiment, an example apparatus is provided comprising: means for receiving a group common downlink control information signal, where the group common downlink control information signal comprises at least one waveform switching indication bit; and means for determining, based upon the at least one waveform switching indication bit, information configured to be used for determining waveform switching. The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may be in a transmit power control command. The at least one waveform switching indication bit may be configured to perform a padding function in the group common downlink control information signal. The waveform switching may comprise dynamic waveform switching (DWS) comprising CP-OFDM and DFT-s-OFDM. The means may be configured to perform: determining a bit length of the at least one waveform switching indication bit; and determining a location of the at least one waveform switching indication bit within a payload of the group common downlink control information signal. The determining of the bit length and/or the location may be based upon information in a transmit power control (TPC) command block. The determined information may be configured to be used to perform switching between two waveforms. The means may be configured to perform: determining, based upon additional information received with a transmit power control (TPC) command block of the group common downlink control information signal, that the apparatus is to use the information to perform waveform switching. The means may be configured to cause the apparatus to determine from the additional information that the apparatus is to perform the determining of the information configured to be used for the determining of the waveform switching. The at least one waveform switching indication bit may comprise a value in a transmit power control (TPC) command block, where the apparatus is configured to perform the determining of the information based, at least partially, upon the value in the TPC command block. The means may be configured to cause the apparatus to perform: determining from a MAC control element that information in a transmit power control (TPC) command block is to be used as the at least one waveform switching indication bit. The means may be configured to cause the apparatus to perform: determining from a radio resource control MAC control element that the group common downlink control information signal is to be used for determining the waveform switching. The at least one waveform switching indication bit may comprise at least one of: determining a most significant bit; determining a least significant bit; determining at least two bits; or determining only a single bit.

In accordance with an example embodiment, an example apparatus is provided comprising: circuitry configured for receiving a group common downlink control information signal, where the group common downlink control information signal comprises at least one waveform switching indication bit; and circuitry configured for determining, based upon the at least one waveform switching indication bit, information configured to be used for determining waveform switching.

In accordance with an example embodiment, an example apparatus is provided comprising: at least one processor; and at least one non-transitory memory storing instructions that, when executed with the at least one processor, cause the apparatus to perform: determining a group common downlink control information signal, where the group common downlink control information signal comprises at least one waveform switching indication bit; providing information with the at least one waveform switching indication bit configured to be used for determining a waveform or a waveform switching to be used by a user equipment; and sending the group common downlink control information signal to a plurality of user equipments.

The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may comprise a bit in a transmit power control command block. The at least one waveform switching indication bit may be configured to perform a padding function in the group common downlink control information signal. The waveform may comprise CP-OFDM or DFT-s-OFDM, or the waveform switching may comprise dynamic waveform switching (DWS) comprising CP-OFDM and DFT-s-OFDM. The waveform switching may comprise dynamic waveform switching (DWS) between at least two of the following: DFT-s-OFDM; DFT-s-OFDM with frequency domain spectral shaping (DFT-s-OFDM FDSS); DFT-s-OFDM with FDSS and spectrum extension (DFT-s-OFDM FDSS-SE); DFT-s-OFDM with tone reservation; DFT-s-OFDM with FDSS, spectrum extension and tone reservation. The instructions, when executed with the at least one processor, may cause the apparatus to indicate with the group common downlink control information signal: a bit length of the at least one waveform switching indication bit; and a location of the at least one waveform switching indication bit within a payload of the group common downlink control information signal. The bit length and/or the location may be indicated with explicit information in a transmit power control (TPC) command block. The bit length and/or the location may be derived from location of at least one non-zero bit. The information may be configured to be used to perform switching between two waveforms. The instructions, when executed with the at least one processor, may further cause the apparatus to perform: sending additional information, with a transmit power control (TPC) command block of the group common downlink control information signal, indicating that less than all of the user equipments are to use the information to perform waveform switching. The instructions, when executed with the at least one processor, may further cause the apparatus to send additional information that the user equipments are to perform a determining, from the information, the waveform for the user equipment to use or whether the user equipment performs the waveform switching. The at least one waveform switching indication bit may comprise a value in a transmit power control (TPC) command block, configured for the user equipments to perform the determining of the waveform or the waveform switching based, at least partially, upon the value in the TPC command block. The instructions, when executed with the at least one processor, may further cause the apparatus to perform: sending a MAC control element indicating that a portion in a transmit power control (TPC) command block is to be used as the at least one waveform switching indication bit. The instructions, when executed with the at least one processor, may further cause the apparatus to perform: sending a radio resource control MAC control element indicating that a portion of the group common downlink control information signal is to be used for determining the waveform or for determining the waveform switching. The at least one waveform switching indication bit may comprise at least one of: a most significant bit; a least significant bit; at least two bits; or only a single bit.

Figure 8:
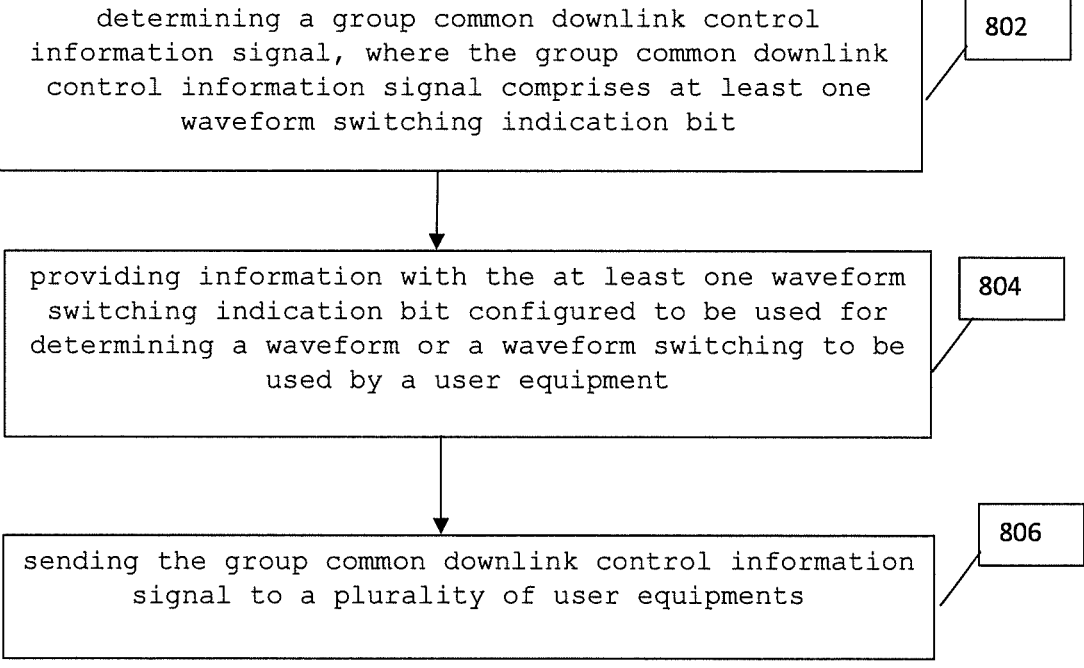
FIG. 8 is a diagram illustrating one example of a method comprising features as described herein.

Referring also to FIG. 8, in accordance with an example embodiment, an example method is provided comprising: determining a group common downlink control information signal, where the group common downlink control information signal comprises at least one waveform switching indication bit as illustrated with block 802; providing information with the at least one waveform switching indication bit configured to be used for determining a waveform or a waveform switching to be used by a user equipment as illustrated with block 804; and sending the group common downlink control information signal to a plurality of user equipments as illustrated with block 806.

The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may comprise a bit in a transmit power control command block. The at least one waveform switching indication bit may perform a padding function in the group common downlink control information signal. The waveform may comprise CP-OFDM or DFT-s-OFDM, or the waveform switching may comprise dynamic waveform switching (DWS) comprising CP-OFDM and DFT-s-OFDM. The waveform switching may comprise dynamic waveform switching (DWS) between at least two of the following: DFT-s-OFDM; DFT-s-OFDM with frequency domain spectral shaping (DFT-s-OFDM FDSS); DFT-s-OFDM with FDSS and spectrum extension (DFT-s-OFDM FDSS-SE); DFT-s-OFDM with tone reservation; DFT-s-OFDM with FDSS, spectrum extension and tone reservation. The method may further comprise indicating with the group common downlink control information signal: a bit length of the at least one waveform switching indication bit; and a location of the at least one waveform switching indication bit within a payload of the group common downlink control information signal. The bit length and/or the location may be indicated with explicit information in a transmit power control (TPC) command block. The bit length and/or the location may be derived from location of at least one non-zero bit. The information may be configured to be used to perform switching between two waveforms. The method may further comprise: sending additional information, with a transmit power control (TPC) command block of the group common downlink control information signal, indicating that less than all of the user equipments are to use the information to perform waveform switching. The method may further comprise sending additional information that the user equipments are to perform a determining, from the information, the waveform for the user equipment to use or whether the user equipment performs the waveform switching. The at least one waveform switching indication bit may comprise a value in a transmit power control (TPC) command block, configured for the user equipments to perform the determining of the waveform or the waveform switching based, at least partially, upon the value in the TPC command block. The method may further comprise: sending a MAC control element indicating that a portion in a transmit power control (TPC) command block is to be used as the at least one waveform switching indication bit. The method may further comprise: sending a radio resource control MAC control element indicating that a portion of the group common downlink control information signal is to be used for determining the waveform or for determining the waveform switching. The at least one waveform switching indication bit comprises at least one of: a most significant bit; a least significant bit; at least two bits; or only a single bit.

In accordance with an example embodiment, an example apparatus is provided with a non-transitory computer readable medium comprising program instructions that, when executed with an apparatus, cause the apparatus to perform the method described above.

In accordance with an example embodiment, an example apparatus is provided comprising: means for determining a group common downlink control information signal, where the group common downlink control information signal comprises at least one waveform switching indication bit; means for providing information with the at least one waveform switching indication bit configured to be used for determining a waveform or a waveform switching to be used by a user equipment; and means for sending the group common downlink control information signal to a plurality of user equipments. The at least one waveform switching indication bit may comprise a sizing bit. The at least one waveform switching indication bit may comprise a bit which is not a sizing bit. The at least one waveform switching indication bit may comprise a zero bit. The at least one waveform switching indication bit may comprise a bit in a transmit power control command block. The at least one waveform switching indication bit may be configured to perform a padding function in the group common downlink control information signal. The waveform may comprise CP-OFDM or DFT-s-OFDM, or the waveform switching may comprise dynamic waveform switching (DWS) comprising CP-OFDM and DFT-s-OFDM. The means may be configured to indicate with the group common downlink control information signal: a bit length of the at least one waveform switching indication bit; and a location of the at least one waveform switching indication bit within a payload of the group common downlink control information signal. The bit length and/or the location may be indicated with explicit information in a transmit power control (TPC) command block. The bit length and/or the location may derived from location of at least one non-zero bit. The information may be configured to be used to perform switching between two waveforms. The means may be configured to further cause the apparatus to perform: sending additional information, with a transmit power control (TPC) command block of the group common downlink control information signal, indicating that less than all of the user equipments are to use the information to perform waveform switching. The means may be configured to send additional information that the user equipments are to perform a determining, from the information, the waveform for the user equipment to use or whether the user equipment performs the waveform switching. The at least one waveform switching indication bit may comprise a value in a transmit power control (TPC) command block, configured for the user equipments to perform the determining of the waveform or the waveform switching based, at least partially, upon the value in the TPC command block. The means may be configured to perform: sending a MAC control element indicating that a portion in a transmit power control (TPC) command block is to be used as the at least one waveform switching indication bit. The means may be configured to perform: sending a radio resource control MAC control element indicating that a portion of the group common downlink control information signal is to be used for determining the waveform or for determining the waveform switching. The at least one waveform switching indication bit may comprise at least one of: a most significant bit; a least significant bit; at least two bits; or only a single bit.

In accordance with an example embodiment, an example apparatus is provided comprising: circuitry configured for determining a group common downlink control information signal, where the group common downlink control information signal comprises at least one waveform switching indication bit; circuitry configured for providing information with the at least one waveform switching indication bit configured to be used for determining a waveform or a waveform switching to be used by a user equipment; and circuitry configured for sending the group common downlink control information signal to a plurality of user equipments.

In accordance with one example embodiment, an example method may comprise receiving a group common downlink control information signal, where the group common downlink control information signal comprises at least one sizing bit; and determining, based upon one or more of the received at least one sizing bit, information configured to be used for switching a waveform. The method may be performed with an apparatus comprising at least one processor; and at least one non-transitory memory storing instructions that, when executed with the at least one processor, cause the apparatus to perform the method.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
at least one processor; and
at least one non-transitory memory storing instructions that, when executed with the at least one processor, cause the apparatus to perform:
receiving a group common downlink control information signal, where the group common downlink control information signal comprises at least one waveform switching indication bit, wherein the at least one waveform switching indication bit is comprised in a transmit power control command block, wherein the at least one waveform switching indication bit performs a padding function in the group common downlink control information signal, and wherein the at least one waveform switching indication bit comprises: a sizing bit, a bit which is not a sizing bit, and a zero bit;
determining, from a medium access control control element, that information in the transmit power control command block is to be used as the at least one waveform switching indication bit;
determining a bit length of the at least one waveform switching indication bit;
determining a location of the at least one waveform switching indication bit within a payload of the group common downlink control information signal, wherein the determining of the bit length and the determining the location are based upon information in the transmit power control command block;
determining, from a radio resource control medium access control control element, that the group common downlink control information signal is to be used for determining waveform switching;
determining, from additional information received with the transmit power control command block of the group common downlink control information signal, to perform determining of information configured to
be used for the determining of the waveform switch-
ing;
determining, based upon the at least one waveform
switching indication bit, the information configured
to be used for determining the waveform switching;
and
determining, based upon the additional information
received with the transmit power control command
block of the group common downlink control infor-
mation signal, to use the information to perform
waveform switching,
wherein the waveform switching comprises dynamic
waveform switching (DWS) comprising CP-OFDM
and DFT-s-OFDM,
wherein the waveform switching further comprises
dynamic waveform switching (DWS) between:
DFT-s-OFDM,
DFT-s-OFDM with frequency domain spectral shaping
(DFT-s-OFDM FDSS),
DFT-s-OFDM with FDSS and spectrum extension
(DFT-s-OFDM FDSS-SE),
DFT-s-OFDM with tone reservation, and
DFT-s-OFDM with FDSS, spectrum extension and
tone reservation, and
wherein the at least one waveform switching indication
bit comprises a value in the transmit power control
command block, where the apparatus is configured to
perform the determining of the information based, at
least partially, upon the value in the transmit power
control command block.

* * * * *